United States Patent Office 2,717,891
Patented Sept. 13, 1955

2,717,891

HYDROXY QUINOLINE TRISAZO-DYESTUFFS

Walter Hanhart, Riehen, and Henri Riat, Arlesheim, Switzerland, assignors to Ciba Limited, Basel, Switzerland, a Swiss firm No Drawing. Application June 13, 1952,
Serial No. 293,425

Claims priority, application Switzerland July 5, 1951

6 Claims. (Cl. 260—155)

According to this invention valuable new trisazodyestuffs are made by coupling a diazo-disago-compound of an amine of the formula (1) $\quad R_1-N=N-R_2-N=N-R_3-NH_2$ in which $R_1$ represents the radical of a hydroxybenzene ortho-carboxylic acid, $R_2$ represents an aromatic radical of the benzene or naphthalene series in which the two azo-linkages are in para-position relatively to one another, advantageously an aromatic radical which contains in a position vicinal to the azo-linkage connecting $R_2$ and $R_3$ a group capable of participating in the formation of metal complexes, and $R_3$ represents the radical of a 5-hydroxynaphthalene-7-sulfonic acid bound in the 6-position to the azo-linkage and which is bound to the diazotizable —$NH_2$ group in at least one of the positions 1 and 2 directly or advantageously through a bridge member, with an azo component which is capable by itself of forming complex metal compounds.

In the above formula the radical $R_2$ is an aromatic radical of the benzene or naphthalene series, advantageously one which contains at most 10 aryl carbon atoms. The two azo-linkages bound to $R_2$ are in para-position relatively to one another, and valuable trisazo dyestuffs are obtained more especially from diazo-disazo-compounds of the above character which contain in a position vicinal to the azo linkage connecting $R_2$ and $R_3$ a group which is capable of participating in the formation of metal complexes, for example, a carboxylic acid group, a hydroxyl group or an alkoxy group of low molecular weight. The amino-disazo-dyestuffs of the above general formula (1) can be made by coupling a diazo compound of an amino-monoazo-dyestuff of the formula (2)

(2)  $R_1-N=N-R_2-NH_2$ in which $R_1$ and $R_2$ have the meanings given above, with a 5-hydroxynaphthalene-7-sulfonic acid of the above character (H—$R_3$—$NH_2$).

Amino-monoazo-dyestuffs of the Formula (2) can be made, for example, by coupling a diazo compound which contains in para-position to the diazotizable amino group a substituent convertible into an amino group, for example, a nitro or acylamino group, with a hydroxybenzene ortho-carboxylic acid capable of coupling, and then converting the aforesaid substituent into an amino group. In this manner, for example, 4-amino-4'-hydroxy-1:1'-azobenzene-3:3'-dicarboxylic acid can be made from diazotized 2-nitro-5-aminobenzene-1-carboxylic acid and 1-hydroxybenzene-2-carboxylic acid, and 4-amino-3:4'-dihydroxy-1:1'-azobenzene-3'-carboxylic acid can be made from diazotized 6-amino-2-methylbenzoxazole and 1-hydroxybenzene-2-carboxylic acid.

Many amino-monoazo-dyestuffs of the Formula (2) can be made by coupling diazotized aminohydroxybenzene-orthocarboxylic acid ($R_1$—$NH_2$) with a middle component of the constitution H—$R_2$—$NH_2$ ($R_1$ and $R_2$ having the meanings given above).

As amino-hydroxybenzene ortho-carboxylic acids there come into consideration 4-amino-1-hydroxybenzene-2-carboxylic acids, for example, 6-chloro- or 6-methyl-4-amino-1-hydroxybenzene-2-carboxylic acid, 4-amino-1-hydroxybenzene-2-carboxylic acid-6-sulfonic acid, but advantageously 4-amino-1-hydroxybenzene-2-carboxylic acid itself.

The amines of the formula H—$R_2$—$NH_2$ serving as middle components for making the amino-monoazo-dyestuffs of the Formula (2) may belong, for example, to the naphthalene series or advantageously the benzene series. The substituent which is capable of participating in the formation of metal complexes may be a hydroxyl group or more especially an alkoxy group. Among the alkoxy groups there are especially suitable ethoxy and above all methoxy groups. As middle components there come into consideration therefore, for example, the following compounds:

Aminobenzene, 1-amino-2:5-dimethylbenzene,
1-amino-3-methylbenzene,
1-aminonaphthalene,
1-amino-2-methoxynaphthalene,
1-amino-2-methoxynaphthalene-6- or -7-sulfonic acid,
1-amino-2-methoxy- or -2-ethoxybenzene,
1-amino-2-methoxy- or -2-ethoxy-5-methylbenzene,
1-amino-2:5-dimethoxy- or -2:5-diethoxybenzene,
1-amino-2-ethoxy-5-methoxybenzene,
1-amino-2-methoxy-5-ethoxybenzene,
1-amino-2-propyloxy-5-methoxybenzene,
1-amino-2-hydroxy-5-methylbenzene.

In the manufacture of the amino-monoazo-dyestuffs of the formula (2) by the method last described it is generally of advantage to condut the coupling in a weakly acid, for example, an acetic acid, medium. When the middle component H—$R_2$—$NH_2$ possesses only a small capacity for coupling it is generally of advantage to couple it in the form of its ω-methane sulfonic acid and subsequently to split off the ω-methane sulfonic acid group.

The azo-components of the formula H—$R_3$—$NH_2$ are naphthalene derivatives which contain in the 5-position a hydroxy group, in the 7-position a sulfonic acid group and the diazotizable —$NH_2$ group bound either directly to the naphthalene nucleus in the 1- or 2-position or linked with at least one of the positions 1 and 2 by means of a bridge member. As compounds of this kind, which contain the —$NH_2$ group bound directly to the naphthalene nucleus there may be mentioned, for example, 1-amino-5-hydroxy-naphthalene-7-sulfonic acid, 2-amino-5-hydroxy-naphthalene-7-sulfonic acid, 2-amino-5-hydroxynaphthalene-1:7-disulfonic acid and 1-chloro-2-amino-5-hydroxy-naphthalene-7-sulfonic acid.

As compounds of the constitution H—$R_3$—$NH_2$, which contain the —$NH_2$ group bound externally in the 2-position, that is to say, through a bridge member, there may 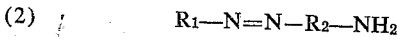 be mentioned, for example, the following derivatives of 1- and 2-amino-5-hydroxynaphthalene-7-sulfonic acid: 1-(4'-aminophenyl)-amino-5-hydroxynaphthalene-7:3'-disulfonic acid, 2-(4'-aminophenyl)-amino-5-hydroxynaphthalene-7-sulfonic acid, 2-(3'-aminophenyl)-amino-5-hydroxynaphthalene-7-sulfonic acid, 2-(3'-aminobenzoyl)-amino-5-hydroxynaphthalene-7-sulfonic acid, 2-(4'-aminobenzoyl)-amino- 5-hydroxynaphthalene-7-sulfonic acid, the asymmetrical urea derivative of the formula

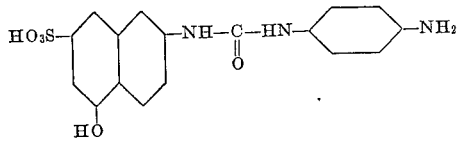

and also those compounds derived from 2-amino-5-hydroxynaphthalene-7-sulfonic acid in which the diazotizable —NH₂ group is bound in the 2-position and also in the 1-position of the naphthalene nucleus, that is to say bound by means of a ring condensed to the naphthalene nucleus such, for example, as in the case of the compounds of the formulae

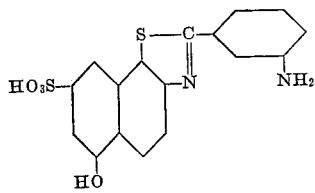

and

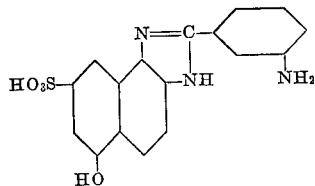

Especially valuable is 2-(4'-aminophenyl)-amino-5-hydroxynaphthalene-7:3'-disulfonic acid of the formula

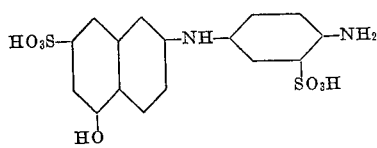

The diazotization of the amino-monoazo-dyestuffs of the constitution $R_1-N=N-R_2-NH_2$ can be carried out by the usual methods in themselves known, for example, with the aid of hydrochloric acid and sodium nitrite. The diazo monoazo-compounds so obtained are then coupled in an alkaline medium, for example, a medium rendered alkaline with an alkali carbonate, with an azo component of the constitution $H-R_3-NH_2$.

In accordance with the process of the invention a diazo-disazo-compound of the general formula (1) is coupled with an azo component which is itself capable of forming complex metal compounds. For this purpose there comes into consideration, for example, a compound which contains a salicylic acid grouping provided that it is capable of coupling with the particular diazo-disazo-compound used. 1-Hydroxybenzene-2-carboxylic acid itself or substitution products thereof capable of coupling, such as 6-methyl-1-hydroxybenzene-2-carboxylic acid, can be coupled only with some of the diazo-disazo-compounds used in the invention, advantageously those which in a position vicinal to the diazotized amino-group are free from substituents rendering the coupling difficult, such as a sulfonic acid group.

Especially valuable as azo-components in this connection are 8-hydroxyquinolines, for example, 8-hydroxyquinoline-7-sulfonic acid and above all 8-hydroxyquinoline itself.

The amino-disazo-dyestuffs are advantageously diazotized by the so-called indirect method, for example, by mixing a solution or suspension, which contains the amino-disazo-dyestuff in the form of an alkali salt and advantageously a slight excess of free alkali together with the necessary quantity of nitrite, with an excess of dilute hydrochloric acid.

The coupling of the amino-disazo-compound with the azo-component of the above kind is advantageously carried out in an alkaline medium, for example, a medium rendered alkaline with an alkali carbonate or alkaline earth metal hydroxide, if desired with the addition of substances assisting coupling, such as pyridine.

In general it is of advantage so to choose the starting materials that there is a total of two sulfonic acid groups in the trisazo-dyestuff.

The new trisazo-dyestuffs of the invention correspond to the general formula $$R_1-N=N-R_2-N=N-R_3-N=N-R_4$$

in which R₁ represents the radical of a 1-hydroxybenzene-2-carboxylic acid,

R₂ represents an aromatic radical of the benzene or naphthalene series in which the two azo-linkages are in para-position relatively to one another, and advantageously an aromatic radical which contains in a position vicinal to the azo linkage connecting R₂ and R₃ a group capable of participating in the formation of metal complexes, R₃ represents the radical of a 5-hydroxynaphthalene-7-sulfonic acid bound in the 6-position to the azo linkage connecting R₂ and R₃, which radical is bound in at least one of the positions 1 and 2 directly or advantageously through a bridge member to the azo linkage connecting R₃ and R₄, and R₄ represents the radical of an azo-component which is itself capable of forming metal complexes.

The dyestuffs are suitable for dyeing a very wide variety of materials, for example, animal fibers such as wool, silk and leather, but especially for dyeing or printing cellulose materials such as cotton, linen, and artificial silk and staple fibers of regenerated cellulose. The dyestuffs can be treated with agents yielding metal by known methods advantageously on the fiber and partially in the dyebath. With advantage, for example, the process of U. S. Patent No. 2,148,659 may be used, in which first the dyeing and then the treatment with an agent yielding metal are carried out in the same bath. As agents yielding metal there come into consideration advantageously those which are stable towards alkaline solutions, such as complex copper tartrates and the like. In some cases especially valuable dyeings can be obtained by working according to the process in which dyeings or prints produced with the metal-free dyestuffs are aftertreated with an aqueous solution containing basic formaldehyde condensation products of compounds which contain at least once the atomic grouping

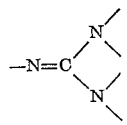

for example, dicyandiamide or dicyandiamidine or compounds, such as cyanamide, easily convertible into compounds containing the above atomic grouping, and also containing a water-soluble copper compound, especially a water-soluble complex copper compound. Such a process is described, for example in British Patent No. 619969.

The following examples illustrate the invention, the parts and percentages being by weight unless otherwise stated and the relationship between parts by weight and parts by volume being the same as that between the kilogram and liter:

*Example 1*

30.1 parts of 2-methyl-4-amino-5-methoxy-4'-hydroxyazobenzene-3'-carboxylic acid are dissolved in 700 parts of warm water with the addition of a quantity of sodium hydroxide solution necessary for neutralization, then mixed with 7 parts of sodium nitrite in the form of a 4-normal solution, and after cooling to 10–12° C. diazotization is brought about by pouring in dilute hydrochloric acid consisting of 35 parts of hydrochloric acid of 30 per cent. strength and 100 parts of water. When the diazotization has finished, coupling is carried out at 0–5° C. with a solution, rendered alkaline with sodium carbonate, of 41 parts of 2-(4'-aminophenyl)-amino-5-hydroxynaphthalene-7:3'-disulfonic acid. The whole is stirred for a few hours, heated to 50° C., neutralized with hydrochloric acid until approximately neutral to Brilliant Yellow paper, and the dyestuff is precipitated by the addition of 20 parts of sodium chloride for each 100 parts by volume of coupling mixture. After cooling, the whole is filtered and the filter residue is washed with sodium chloride solution of 25 per cent. strength. The dyestuff is dissolved in 1500 parts of water with the addition of 12.5 parts of sodium hydroxide solution of 30 per cent. strength, then mixed with 7 parts of sodium nitrite in the form of a 4-normal solution, diazotization is brought about at 10–15° C. by pouring in 60 parts of hydrochloric acid of 30 per cent. strength previously diluted with 120 parts of water. The whole is stirred for a few hours, the excess of nitrite is decomposed with sulfamic acid, at first a weakly hydrochloric acid solution of 14.5 parts of 8-hydroxyquinoline and then a solution of 60 parts of sodium carbonate in 250 parts of water are added. The temperature is maintained at 5–10° C. by the addition of ice. When the coupling has finished, the whole is heated to about 70° C., 10 parts of sodium chloride are added for every 100 parts by volume of mixture, and the dyestuff of the formula

Example 2

38.1 parts of 2-methyl-4-amino-5-methoxy-4'-hydroxy - 1:1' - azobenzene - 3' - carboxylic acid-5'-sulfonic acid are dissolved in 700 parts of warm water with the addition of a quantity of a sodium hydroxide solution required for neutralization, then mixed with 7 parts of sodium nitrite in the form of a 4-normal solution, and after cooling to 10–12° C. diazotization is brought about by pouring in dilute hydrochloric acid consisting of 35 parts of hydrochloric acid of 30 per cent. strength and 100 parts of water. When the diazotization has finished coupling is brought about at 0–5° C. with a solution, rendered alkaline with sodium carbonate of 33 parts of 2-(4'-aminophenyl)-amino-5-hydroxynaphthalene-7-sulfonic acid. The whole is stirred for a few hours, heated to 50° C., neutralized with hydrochloric acid until approximately neutral to Brilliant Yellow paper, and the dyestuff is precipitated by the addition of 20 parts of sodium chloride for every 100 parts by volume of mixture. After cooling, the mixture is filtered and the filter residue is washed with sodium chloride solution. The dyestuff is dissolved in 1500 parts of water with the addition of 12.5 parts of sodium hydroxide solution of 30 per cent. strength, then mixed with 7 parts of sodium nitrite in the form of a 4-normal solution and diazotization is brought about at 10–15° C. by pouring in 60 parts of hydrochloric acid of 30 per cent. strength previously diluted with 120 parts of water. The whole is stirred for a few hours, the excess of nitrite is decomposed by means of sulfamic acid, first a weak hydrochloric acid solution of 14.5 parts of 8-

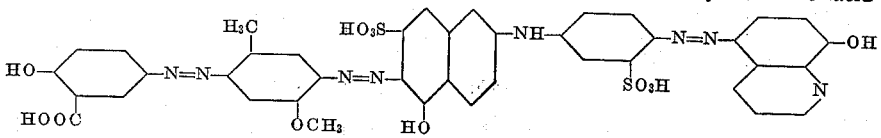

is separated by filtration. When dry, it is a blackish powder, which dissolves in concentrated sulfuric acid with a dirty blue coloration, and in water with a blue-violet coloration, and yields on cotton an after-coppered greenish navy blue dyeing of good fastness to light and excellent fastness to washing.

A somewhat more greenish dyeing dyestuff is obtained by using 2:5-dimethoxy-4-amino-4'-hydroxyazobenzene-3'-carboxylic acid instead of 2-methyl-4-amino-5-methoxy-4'-hydroxyazobenzene-3'-carboxylic acid. However, by using unsubstituted 4-amino-4'-hydroxyazobenzene-3'-carboxylic acid benzene instead, there is obtained a strong reddish blue tint. By replacing the 2-(4' - aminophenyl) - amino - 5 - hydroxynaphthalene-7:3'-disulfonic acid by 2-amino-5-hydroxynaphthalene-7-sulfonic acid there is obtained a dyestuff dyeing blackish navy blue tints.

The dyestuffs obtainable according to the foregoing paragraph correspond to the formulae:

hydroxyquinoline and then a solution of 60 parts of sodium carbonate in 250 parts of water are added. The temperature is maintained at 5–10° C. by the addition of ice. When the coupling is complete the whole is heated to about 70° C., 10 parts of sodium chloride are added for every 100 parts by volume of coupling mixture, and the dyestuff is filtered off. When dry it is a blackish powder which dissolves in concentrated sulfuric acid with a dirty violet coloration and in water with a blue coloration and dyes cotton by a single bath or 2-bath after-coppering process greenish navy blue tints.

In the following table are given further valuable dyestuffs which are obtained by coupling a diazo-compound of the amino-azo-dyestuff in column I with the azo component in column II, further diazotizing the amino-disazo-dyestuff so obtained, and coupling the diazo compound with the end product in column III. In column IV is given the tint of the after-coppered dyeing on cotton.

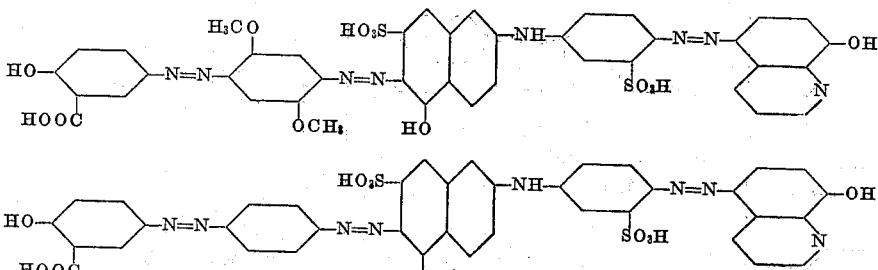

and

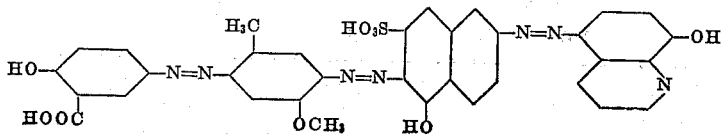

| | I<br>R₁—N=N—R₂—NH₂ | II<br>H—R₃—NH₂ | III<br>H—R₄ | coppered dyeing on cotton |
|---|---|---|---|---|
| 1 | 4-hydroxy-3-carboxyphenyl-azo-4'-aminophenyl-3'-carboxy | 1-hydroxy-6-sulfo-naphthyl-(3)-amino-(4'-amino-3'-sulfo)phenyl | 8-hydroxyquinoline | navy blue. |
| 2 | 4-hydroxy-3-carboxyphenyl-azo-3'-hydroxy-4'-aminophenyl | 1-hydroxy-6-sulfo-naphthyl-(3)-amino-(4'-amino-3'-sulfo)phenyl | 8-hydroxyquinoline | black-blue. |
| 3 | 4-hydroxy-3-carboxyphenyl-azo-3'-hydroxy-4'-aminophenyl | 1-hydroxy-6-sulfo-naphthyl-(3)-amine | 8-hydroxyquinoline | green-black. |
| 4 | 3-chloro-4-hydroxy-5-carboxyphenyl-azo-2'-methyl-4'-amino-5'-methoxyphenyl | 1-hydroxy-6-sulfo-naphthyl-(3)-amino-(4'-amino-3'-sulfo)phenyl | 8-hydroxyquinoline | navy blue. |
| 5 | 4-hydroxy-3-carboxyphenyl-azo-3'-hydroxy-4'-aminophenyl | 1-amino-2-hydroxy-6-sulfo-naphthalene | 8-hydroxyquinoline | black-grey. |
| 6 | 4-hydroxy-3-carboxyphenyl-azo-2'-methyl-4'-amino-5'-methoxyphenyl | 1-sulfo-4-hydroxy-5-naphthyl-amino-(4'-amino-3'-sulfo)phenyl | 8-hydroxyquinoline | reddish navy blue. |
| 7 | 4-hydroxy-3-carboxyphenyl-azo-naphthyl-amino-sulfo | 1-hydroxy-6-sulfo-naphthyl-NH-CO-phenyl-NH₂ | 2-hydroxy-benzoic acid | black-green. |
| 8 | 4-hydroxy-3-carboxyphenyl-azo-naphthyl-amino-sulfo | benzimidazole-sulfo-hydroxy-naphthyl-amino | 8-hydroxyquinoline | Do. |
| 9 | 4-hydroxy-3-carboxyphenyl-azo-2'-methyl-4'-amino-5'-methoxyphenyl | 1-hydroxy-6-sulfo-naphthyl-(3)-amine | 3-methyl-2-hydroxy-benzoic acid | blue-green. |

The 4-amino-3:4'-dihydroxy-1:1'-azobenzene-3'-carboxylic acid used for making the dyestuffs numbers 2 and 5 in the above table can be made as follows:

148 parts of 6-amino-2-methylbenzoxazole of the formula

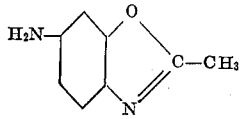

(obtainable as described in the Journal of the Chemical Society, London, 1930, page 2687) are diazotized by means of hydrochloric acid and sodium nitrite, and then coupled in a medium rendered alkaline with sodium carbonate with 138 parts of 1-hydroxybenzene-2-carboxylic acid. The dyestuff so obtained is precipitated by the addition of sodium chloride and separated by filtration. It is then treated for 4–6 hours at the boiling temperature with dilute sodium hydroxide solution, whereby the oxazole ring is split off. Then the resulting 4-amino-3:4'-dihydroxy-1:1'-azobenzene-3'-carboxylic acid is precipitated by the addition of hydrochloric acid and filtered off. The product may if desired be dried.

*Example 3*

In a dyebath which contains in 4000 parts of water 1.5 parts of the dyestuff as described in the first paragraph of Example 1 and 2 parts of anhydrous sodium carbonate, there are entered at 50° C. 100 parts of cotton, the temperature is raised in the course of 20 minutes to 90–95° C., 40 parts of crystalline sodium sulfate are added, and dyeing is carried on for 30 minutes at 90–100° C. Then the bath is allowed to cool to about 70° C., 3 parts of complex sodium copper tartrate of approximately neutral reaction are added, coppering is carried on for ½ hour at about 80° C., and the dyeing is then rinsed with cold water. If desired the dyeing may be soaped by after-treating with a solution containing 5 parts of soap and 2 parts of anhydrous sodium carbonate in 1000 parts by volume of water. There is obtained a greenish navy blue dyeing of very good fastness to washing and good fastness to light.

What is claimed is:

1. A tris-azo dye-stuff corresponding to the formula

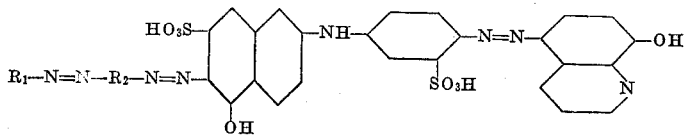

in which $R_1$ represents the radical of a 1-hydroxybenzene-2-carboxylic acid attached to the adjacent —N=N— group in paraposition to the hydroxy group, and $R_2$ represents an aromatic radical of the benzene series to which the two adjacent azo groups are bound in para-position relatively to one another.

2. A trisazo-dyestuff containing two sulfonic acid groups and corresponding to the formula

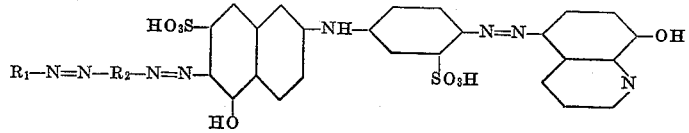

in which $R_1$ represents the radical of a 1-hydroxybenzene-2-carboxylic acid attached to the adjacent —N=N— group in para-position to the hydroxy group, and $R_2$ represents an aromatic radical of the benzene series to which the two azo groups are bound in para-position relatively to one another and which contains in ortho-position to the azo group connecting $R_2$ and the naphthalene nucleus a methoxy group.

3. The trisazo-dyestuff corresponding to the formula

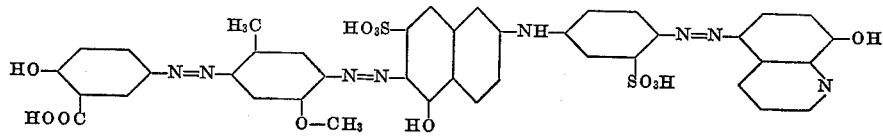

4. The trisazo-dyestuff corresponding to the formula

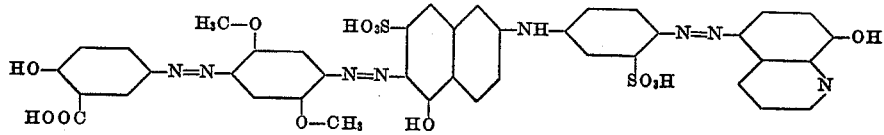

5. The trisazo-dyestuff corresponding to the formula

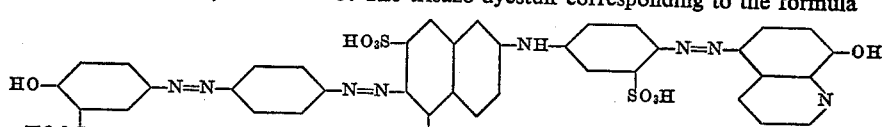

6. The trisazo-dyestuff corresponding to the formula

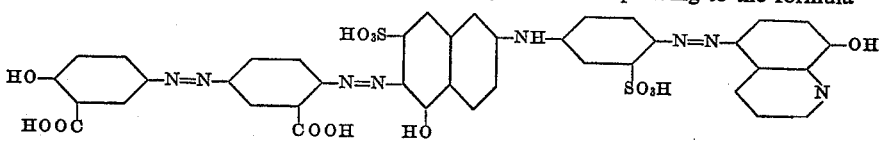

References Cited in the file of this patent
UNITED STATES PATENTS
2,283,294    Straub et al. _____ May 19, 1942